US008692178B2

(12) United States Patent
Liou et al.

(10) Patent No.: US 8,692,178 B2
(45) Date of Patent: Apr. 8, 2014

(54) PHOTOSENSITIVE CONTROL SYSTEM, AND METHOD OF OPERATING THEREOF

(75) Inventors: Jian-Chiun Liou, Renwu Township (TW); Chun-Jung Chen, Zhudong Township (TW)

(73) Assignee: Industrial Technology Research Institute (TW)

( * ) Notice: Subject to any disclaimer, the term of this patent is extended or adjusted under 35 U.S.C. 154(b) by 334 days.

(21) Appl. No.: 12/813,720

(22) Filed: Jun. 11, 2010

(65) Prior Publication Data

US 2011/0303826 A1 Dec. 15, 2011

(51) Int. Cl.
*H01L 31/09* (2006.01)
*H01L 31/0232* (2006.01)

(52) U.S. Cl.
USPC ........................... 250/208.4; 250/227.24

(58) Field of Classification Search
USPC ............. 250/216, 227.11, 227.22; 385/16
See application file for complete search history.

(56) References Cited

U.S. PATENT DOCUMENTS

| | | | |
|---|---|---|---|
| 4,506,153 A * | 3/1985 | Ohno | 250/227.23 |
| 5,689,340 A * | 11/1997 | Young | 356/401 |
| 6,795,011 B1 | 9/2004 | Berthoud et al. | |
| 6,987,256 B2 | 1/2006 | English et al. | |
| 6,987,258 B2 | 1/2006 | Mates | |
| 2003/0026524 A1 * | 2/2003 | Kakizaki et al. | 385/16 |
| 2003/0179680 A1 | 9/2003 | Park et al. | |

FOREIGN PATENT DOCUMENTS

| | | |
|---|---|---|
| CN | 101400207 | 4/2009 |
| TW | M371274 | 12/2009 |

OTHER PUBLICATIONS

Office Action dated Jul. 26, 2012 from corresponding application No. CN 201010284001.5.
Xiang, Si-hua, et al., "Investigation and Simulation of Flexible Bionic Compound Eyes Imaging System", Semiconductor Optoelectronics, vol. 26 Supplement, Mar. 2005, pp. 26-29.

* cited by examiner

*Primary Examiner* — Tony Ko
(74) *Attorney, Agent, or Firm* — Lowe Hauptman & Ham, LLP (57) ABSTRACT

A photosensitive control system includes a light source device configured to provide a directional light beam and a photosensitive device which includes at least one pre-arranged photosensitive unit. Also, the photosensitive control system has a light guide device configured between the light source device and the photosensitive device for guiding the light beam to the at least one photosensitive unit and therefore the photosensitive device produces a sensing signal. In addition, the photosensitive control system includes a controller configured to receive the sensing signal and provide control data in accordance with the sensing signal.

4 Claims, 11 Drawing Sheets

PHOTOSENSITIVE CONTROL SYSTEM, AND METHOD OF OPERATING THEREOF

BACKGROUND

1. Technical Field

The present disclosure relates to a multifunction control system, in particular in at least some embodiments to a photosensitive multifunction control system, controllable by a light source device, and a method thereof.

2. Description of the Related Art

For most electronic devices, user has to manually turn on/off the device. For example, when the user needs to leave the room, he/she has to manually turn off the light switch to reduce electricity consumption. For another example, in some cases, a specific wireless remote control device, such as a radio frequency (RF) remote control module or an infrared (IR) remote control module, can be used to control electronic devices.

Wireless remote control devices typically have many buttons and through manipulation of each button the user can remotely cause the controlled device to perform a corresponding specific operation. An RF remote control device or an IR remote control device, in many instances, uses a fixed communication channel, and has a maximum effective range.

Another example for an application of a control module uses a sensor to sense the actions of the user to thereby control the switch of an electronic device.

SUMMARY

In one or more embodiments, a photosensitive control system is provided, which comprises: a light source device configured to provide directional light; a photosensitive device comprising at least one photosensitive unit arranged to generate a sensing signal responsive to the directional light; a light guide device for guiding the directional light to the at least one photosensitive unit; and a controller coupled to the photosensitive device to generate control data in responsive to the sensing signal.

In one or more embodiments, a photosensitive control module for use in a control system is also provided, the photosensitive control module comprising: a photosensitive device having a plurality of photosensitive units; and a light guide device configured to guide the light to one of the photosensitive units or a group of the photosensitive units responsive to receipt of directional light and for causing the photosensitive device to generate a sensing signal so as to transfer a control message in accordance with the directional light to the control system via the sensing signal.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein:

FIGS. 1-5A are diagrams of photosensitive multifunction control systems in accordance with various embodiments of the present disclosure;

DETAILED DESCRIPTION

One or more embodiments disclosed herein provide a multifunction control system using a light source device capable of generating a directional light beam. One or more embodiments disclose a light guiding device to guide the received directional light beam to a photosensitive device having at least one photosensitive unit and thereby resulting in the photosensitive device providing a sensing signal for a controller. One or more embodiments disclose a controlling method using the multifunction control system.

Photosensitive Device

In one embodiment, a photosensitive device with at least one pre-arranged photosensitive unit disposed on a substrate is disclosed. When a light beam is guided to the at least one photosensitive unit, the photosensitive device generates a sensing signal and the controller generates control data corresponding to the sensing signal. In some embodiments, the substrate is a flexible substrate or a semiconductor substrate.

In another embodiment, pre-arranged photosensitive units are disposed in different areas. Depending on the area to which the light beam is guided, the photosensitive device generates respective different sensing signals and the controller produces respective different control data corresponding to the respective different sensing signals.

In still other embodiments, the photosensitive unit is disposed on independent elements, and the elements are arranged in a predetermined certain manner. Depending on the independent element to which the light beam is guided, the photosensitive device produces respective different sensing signals and the controller generates respective different control data corresponding to the respective different sensing signals.

The photosensitive unit in some embodiments includes a pixel of image sensor, a light receptor, a photoreceptor or an optoelectronic element.

In still other embodiment, the photosensitive unit includes a complementary metal-oxide-semiconductor (CMOS) photo-sensing element, a charge-coupled device (CCD) or a combination thereof.

Light Source Device

A working distance between the photosensitive device and the light source device is in the range with which the photosensitive device receives and detects the light beam and then produces the sensing signal. The working distance between the photosensitive device and the light source device in some embodiments extends greater than 50 meters and even several thousands of meters. In some embodiments, the working distance is up to 7,000 meters or more by using a laser light source device.

The multifunction control system described above not only considers the working distance between the photosensitive device and the light source device but also uses directional light sources, such as laser sources, to provide a directional light beam. Other directional light sources such as LEDs (light emitting diodes) are also used in further embodiments. In addition to a single energy and single frequency laser light beam, in some embodiments, the system uses a laser beam of different energy levels to provide different corresponding control data. For example, the control data comprises positioning information when the laser beam has a lower energy level and the control data comprises activation information when the laser beam has a higher energy level. The multifunction control system uses the positioning and activation information for long distance control in some embodiments.

In at least one embodiment, the laser beam is a discontinuous light beam with pulse information, and the controller provides different control data corresponding to different pulse information. The photosensitive unit of the photosensitive device receives the discontinuous light beam in order to generate a pulse signal, and the controller produces the control data according to the pulse signal.

Light Guide Device

In order to guide the directional light beam efficiently to the photosensitive device and thus to generate sensing signals, the multifunction control system includes a light guide device which is disposed between the light source device and the photosensitive device. Therefore, the attenuation of the light beam energy is reduced, and the light beam is also guided to one or more predetermined photosensitive units in the photosensitive device.

In an embodiment, the light guide device comprises a microlens array and a flexible waveguide device. The microlens array is used to condense or focus the light beam into a light speckle of a specified light intensity distribution for Light Beam Collimation, Focusing, Homogenizing, Light Beam Splitting or Imaging, and so on. The waveguide devices are used to guide the focused light beam to the photosensitive device and thus one or a group of the photosensitive units sense the light beam.

In an embodiment, the microlens array is a Fly Eye Lens, and includes a Compound Light Directing Member bent at a predetermined angle. In another embodiment, the microlens array comprises many Lenslets or Microlenticulars on a curved surface.

In an embodiment, the wave guide device includes a bunch of light pipes or many individual light pipes, or optical fibers. These waveguide devices are used to guide the light beam passing through one of more of the lenslets or microlenticulars in the microlens array to the photosensitive device.

Controller and Controlled Devices

A sensing signal produced by the multifunction control system using directional light beams as described above is transferred to a controller and the controller then produces control data, accordingly. This control data is coupled, in some embodiments, to at least a switch for control purposes.

In some embodiments, the controlling operation is of a Multiple-Objects-Multiple-Switches architecture, or a Single-Object-Multiple-Switches architecture.

In the Multiple-Objects-Multiple-Switches control architecture, each switch corresponds to a controlled device including but not limited to, any electronic or electrical apparatus such as projectors, televisions, light fixtures, appliances, etc. In an embodiment, a toggle switch type control functionality is used to turn on or turn off the corresponding device. In another embodiment, the switch controls the corresponding device in an Incremental and Rotary Manner. The Incremental and Rotary Manner adopts a multiple stage switch, wherein the switch is adjusted from the lowest stage to the highest stage step-by-step, forward or backward, in cycles.

In the single-object-multiple-switch control architecture, switches are used to control different features or functions of a device. The control data, in some embodiments, controls the switches corresponding to different functions of a projector, for example, slide show start, slide show end, change slide, subtitle display, and so on. One or more switches is operated, in some embodiments, in the Incremental and Rotary Manner to adjust the brightness of a light fixture from dark to light and vice versa step-by-step.

Reference will now be made in detail to exemplary embodiments which are illustrated in the accompanying drawings. Unless otherwise noted, the same reference numbers are used throughout the drawings to refer to the same or like parts.

Figure 1:
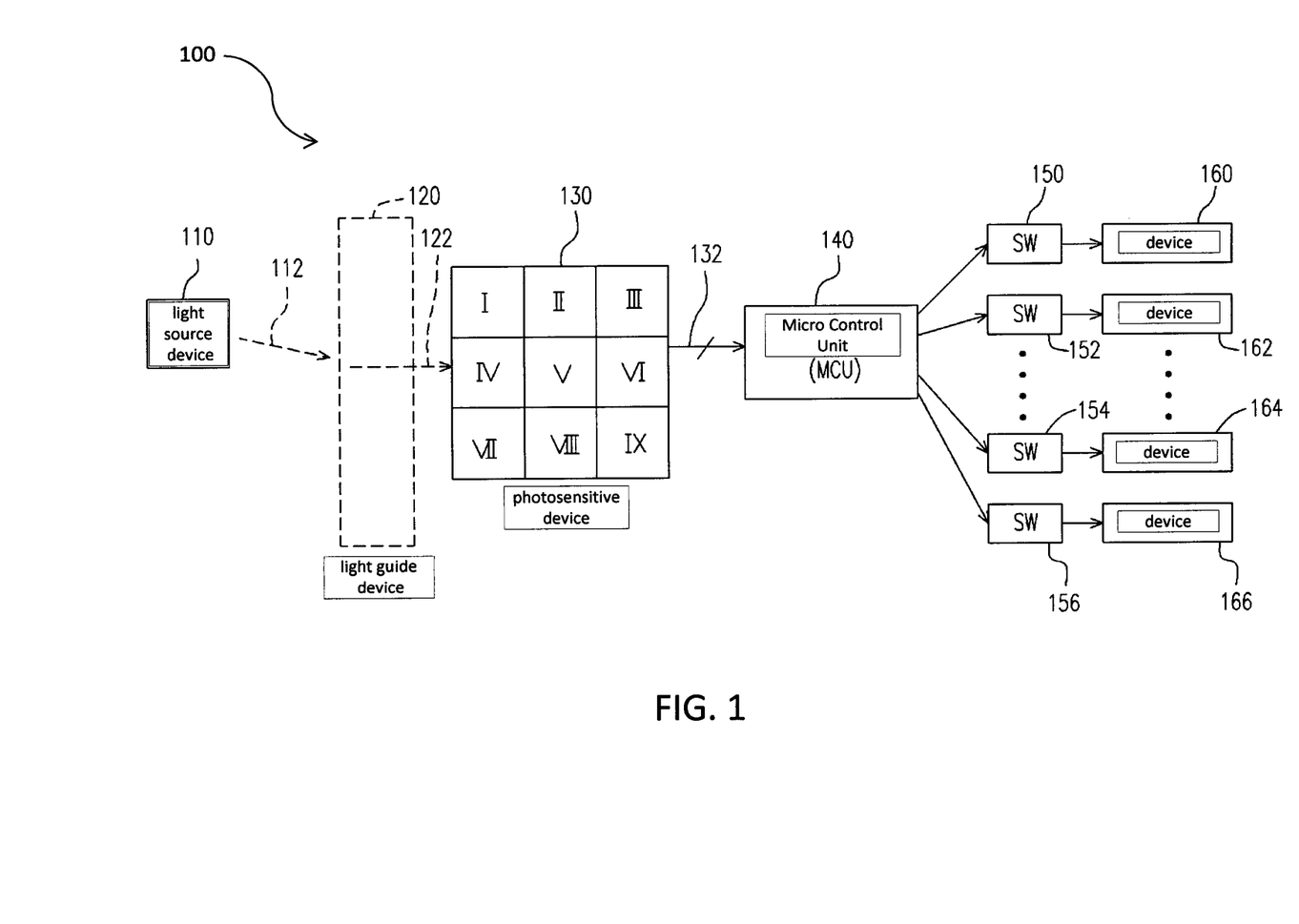

Referring to FIG. 1, a photosensitive multifunction control system comprises a light source device 110, a light guide device 120, a photosensitive device 130, a Micro Control Unit (MCU) 140 and a plurality of switches (SW). Each switch (SW), e.g., 150, 152, 154, 156, is connected between the MCU 140 and a corresponding controlled device, e.g., 160, 162, 164, 166.

The light source device 110 is configured to generate a directional light beam 112 of a certain energy level, such as laser light. The light guide device 120 is positioned between the light source device 110 and the photosensitive device 130. The light guide device 120 guides light beam 112 generated by light source device 110 toward photosensitive device 130. The photosensitive device 130 is configured with a predetermined arrangement of one or more photosensitive units. The directional light beam 122 is incident into one or a group of the light sensor units comprising photosensitive device 130 to cause generation of sensing signal 132 which is then transmitted to micro control unit (MCU) 140.

In an embodiment, photosensitive device 130 includes many photosensitive units disposed on a substrate in a predetermined arrangement. When light beam 112 is guided to one or more photosensitive units, the photosensitive device generates a sensing signal 132, accordingly.

In another embodiment, e.g., in a distant control scenario, the photosensitive units of the photosensitive device 130 are arranged in different sensing regions such as I, II, III, IV~IX. When light beam 112, guided to one of sensing regions I, II, III, IV~IX impacts the photosensitive device, the photosensitive device generates a corresponding sensing signal 132 in at least some embodiments. In other words, different sensing regions I, II, III, IV~IX generate different sensing signals 132. Each sensing region includes one or more photosensitive units.

In some embodiments, substrate on which the photosensitive device 130 is constructed is, but is not limited to, a flexible substrate or a semiconductor substrate. Each photosensitive unit on the substrate includes, in some embodiments, one or more of a pixel of image sensor, a light receptor, a photoreceptor or an optoelectronic element. In another embodiment, each photosensitive unit includes a CMOS, a CCD, or a combination of CMOS and CCD photosensitive device.

Micro control unit (MCU) 140 generates the corresponding control data to control the switch(es) in response to receipt of sensing signal 132.

When a light beam 112 is guided to one of sensing regions I, II, III, IV~IX of photosensitive device 130, e.g., sensing region I, the micro control unit (MCU) 140 receives the corresponding sensing signal 132 generated from photosensitive device 130 and then controls the corresponding switch, e.g., switch 150, of the respective specific device, e.g., device 160. When light beam 112 is guided to another sensing region of photosensitive device 130, e.g., sensing region II, the micro control unit (MCU) 140 receives another corresponding sensing signal 132 generated from photosensitive device 130 and then controls another corresponding switch, e.g., switch 152, of the respective specific device, e.g., device 162, etc. In some embodiments, several sensing regions I, II, III, IV~IX generate the same sensing signal 132 that causes the MCU 140 to control the same switch, and/or a single sensing region generates a sensing signal 132 that causes the MCU 140 to control several switches.

In one embodiment, the sensing signal 132 has digital logic signal levels such as logic 1 for "light" or "activate", and logic 0 for "no light" or "deactivate." In another embodiment, sensing signal 132 is a coded signal that represents different light intensity levels (e.g., for high energy or low energy intensity control). That is, the MCU 140 is configured in some embodiments to use different ways, such as one-on-one mapping, coding, or multiplexing, etc., to generate control signals for switch controlling. Therefore in some embodiments, the MCU 140 is capable of specifying or selecting the strength of light energy, or controlling the operation of the controlled device(s), such as volume level adjustment, light control, TV channel tuning, and so on.

In some embodiments, the multi-function control system 100 guides the light beam 112 to photosensitive device 130 directly to generate sensing signal 132. Therefore in at least some embodiments, the system does not require light guide device 120, i.e., light guide device is optional. However, the system guides the light beam 112 to the photosensitive device 130 more efficiently, and reduces the attenuation of the light beam by adding light guide device 120, in some embodiments. Also, the light guide device 120 is capable of guiding the light beam 112 to a predetermined arrangement of one or more photosensitive units 130, or to one or more sensing regions such as sensing regions I, II, III, IV~IX.

The light guide device 120 in some embodiments includes a micro-lens array and a flexible wave-guide (Wave-Guide) device. The micro-lens array is used to condense light beam 112 to a distribution of designated light intensity, so as to be used in operations like Collimation, Focusing, Homogenizing, Beam Splitting, or Imaging, etc. for causing one or more photosensitive units to respond correspondingly.

In another embodiment, the micro-lens array is a Fly Eye Lens, made by a compound light-directing member with a curvature. In a further embodiment, the micro-lens array includes a plurality of micro-lenses such as Lenslets or Microlenticular, deployed on a curved surface. In another embodiment, the wave-guide device is formed by a bundle of light guides (Light Pipes) or a plurality of individual light pipes which direct(s) the light beam passed through one or more of such micro-lenses of the micro-lens array to a corresponding photosensitive unit or a corresponding group/region of photosensitive units of the photosensitive device 130.

In some embodiments, when the working distance between the photosensitive device 130 and light source device 110 is taken into consideration, the maximum working distance is the farthest distance at which the photosensitive device 130 is able to receive and to sense light beam 112 in order to generate a corresponding photosensitive signal. Furthermore, light guide device 120 enhances the light reception of photosensitive device 130.

In some embodiments, the multifunction control system 100 has long distance controlling ability with different configurations of the photosensitive device 130 and light source device 110. For example, the working distance between photosensitive device 130 and light source device 110 in some embodiments extends greater than 50 meters or even up to several kilometers. In some embodiments, the light source device 110 generates a directional control light beam with an effective distance of several kilometers by using a laser beam generator. For example, some present industrial laser beam generators have a control distance of more than seven kilometers.

In some embodiments, the multifunction control systems use different light source devices 110, such as popularly used laser pens/pointers or other types of laser generators. In an embodiment, a directional laser beam with control data is used. For example, MCU 140 in some embodiments is configured to distinguish different control data responsive to receipt of different high and low energy intensity laser beams. A low-energy intensity laser beam is designated with position data, and a high-energy intensity laser beam is designated with activation data. Users can achieve their control purposes even at long distant range by using such positioning and activation data by activating an appropriate laser energy level of the light source device 110.

In addition, the light source device 110 in some embodiments generates non-continuous light beams with pulse encoded information. The MCU 140 distinguishes different control data by the pulse encoded information. For example, the non-continuous light beam sensed by the photosensitive unit of photosensitive device 130 within a period of time is translated into pulse signals, and then interpreted as control data.

FIG. 1 is a diagram illustrating the photosensitive multifunction control system 100 as used in a Multiple-Objects-Multiple-Switches control architecture. In the multi-objects-multi-switches control architecture, each switch (SW), e.g., 150-156, corresponds to an independent device, e.g., 160-166.

Figure 2:
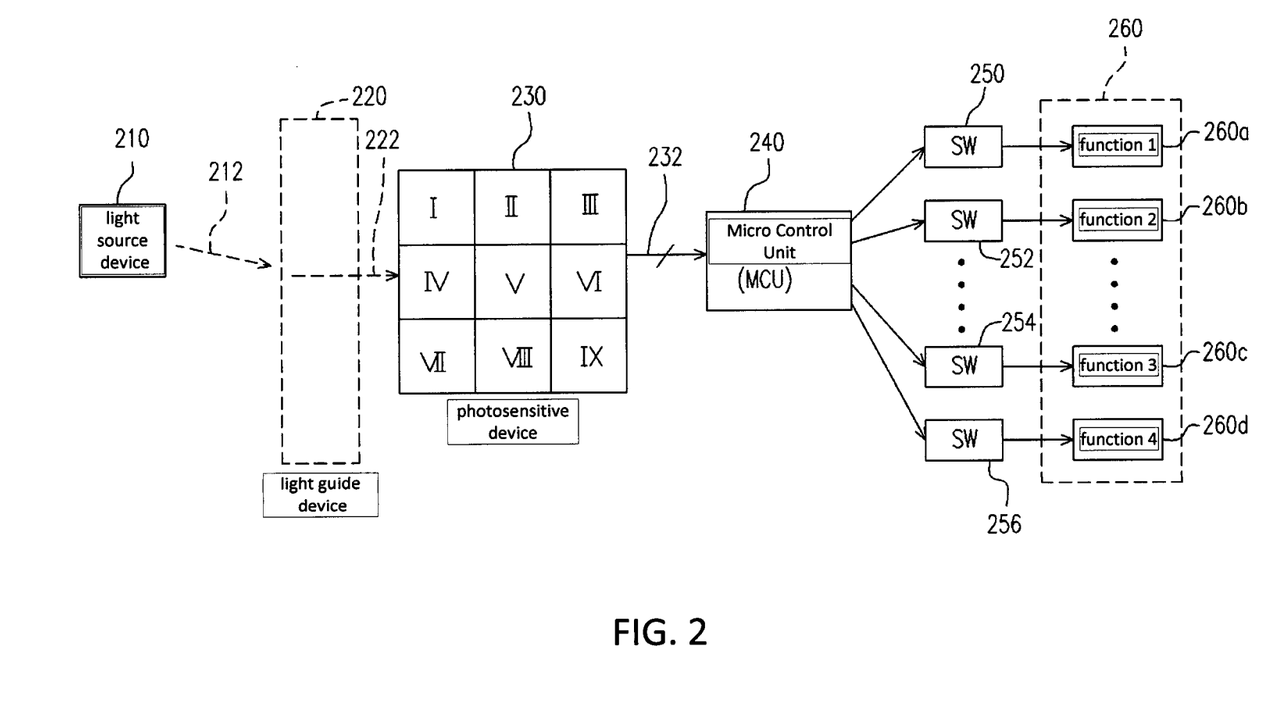

The control data from MCU 140 can control a plurality of switches (SW), to switch the respective devices, such as projectors, TVs, light fixtures or other electrical appliances, and so on. In one embodiment, at least one of the switches is a toggle switch to turn the respective device ON/OFF or a switch that uses an Incremental and Rotary Manner to switch the corresponding device (e.g., a light fixture) through a plurality of stages (e.g., brightness levels) from the first stage to the last stage, or vice versa, in cycles. Other control mechanisms are within the scope of the embodiments FIG. 2 is a diagram illustrating another embodiment of the photosensitive multifunction control system 100 as used in a Single-Object-Multiple-Switches control architecture. The photosensitive multifunction control system has at least one light source device 210, light guide device 220, photosensitive device 230, MCU 240 and plurality of switches (SW) 250, 252, 254, 256 to control different functions 260a, 260b, 260c, 260d of controlled device 260.

The architecture shown in FIG. 2 is similar to the photosensitive multifunction control system in FIG. 1. The difference is that the MCU 240 controls the different functions of a single device 260. The description of the elements identical to those shown in FIG. 1 is omitted here.

The light source device 210 generates a directional light beam 212 of a fixed or variable energy level, such as a laser beam. The light guide device 220 is positioned between the light source device 210 and photosensitive device 230, and is used for guiding light beam 212, which is generated by light source device 210, to photosensitive device 230. The photosensitive device 230 has a plurality of photosensitive units in a predetermined arrangement. The guided light beam 222 is incident into one or a group of the photosensitive units for generating sensing signal 232 which is transmitted to MCU 240. The sensing signal 232 received by the MCU 240 is then encoded into corresponding control data for controlling the corresponding one or more of the switches of different functions of controlled device 260. For example, the MCU 240 controls the switch 250 by first control data, for controlling first function 260a of controlled device 260. The first control data is generated in response to the light beam 212 guided to a first one of sensing regions I~IX of the photosensitive device 230 and/or based on first information (e.g., pulse information or energy level, etc.) included in the light beam 212. The MCU 240 controls the switch 252 by second control data, for controlling second function 260b of controlled device 260. The second control data is generated in response to the light beam 212 guided to a second one of sensing regions I~IX of the photosensitive device 230 and/or based on second information (e.g., pulse information or energy level etc.) included in the light beam 212. In some embodiments, the control is performed using a Toggle Switch manner (e.g., on/off) or in an Incremental and Rotary Manner.

In one embodiment of the single-object-multi-switches control architecture, a plurality of switches control multiple functions in a single controlled device. According to the control data interpreted by MCU 240, the system controls a plurality of switches 250, 252, 254, 256 corresponding to different functions of a controlled device 260, such as functions of a projector, including but not limited to, turn on, turn off, start or stop projection, display or stop display of captions or subtitles, etc. In addition, the control in some embodiments is performed in an Incremental and Rotary Manner to switch the corresponding features, such as the projector brightness adjustment from dark to bright step-by-step.

That is, the MCU 240 is configured in some embodiments to adopt one-on-one mapping, coding, multiplexing, or a combination of these or other methods to control the switches. Therefore, functions of the MCU 240 include, but are not limited to, determination of the strength of light energy, different computational functions, voice volume control, brightness control, or TV channel tuning, and so on.

In some embodiments, a mixed architecture of the single-object-multi-switches control and the multiple-objects-multi-switches control is configured, in which some switches are connected to individually control respective different devices whereas other switches are connected to control different functions of the same device.

Figure 3:
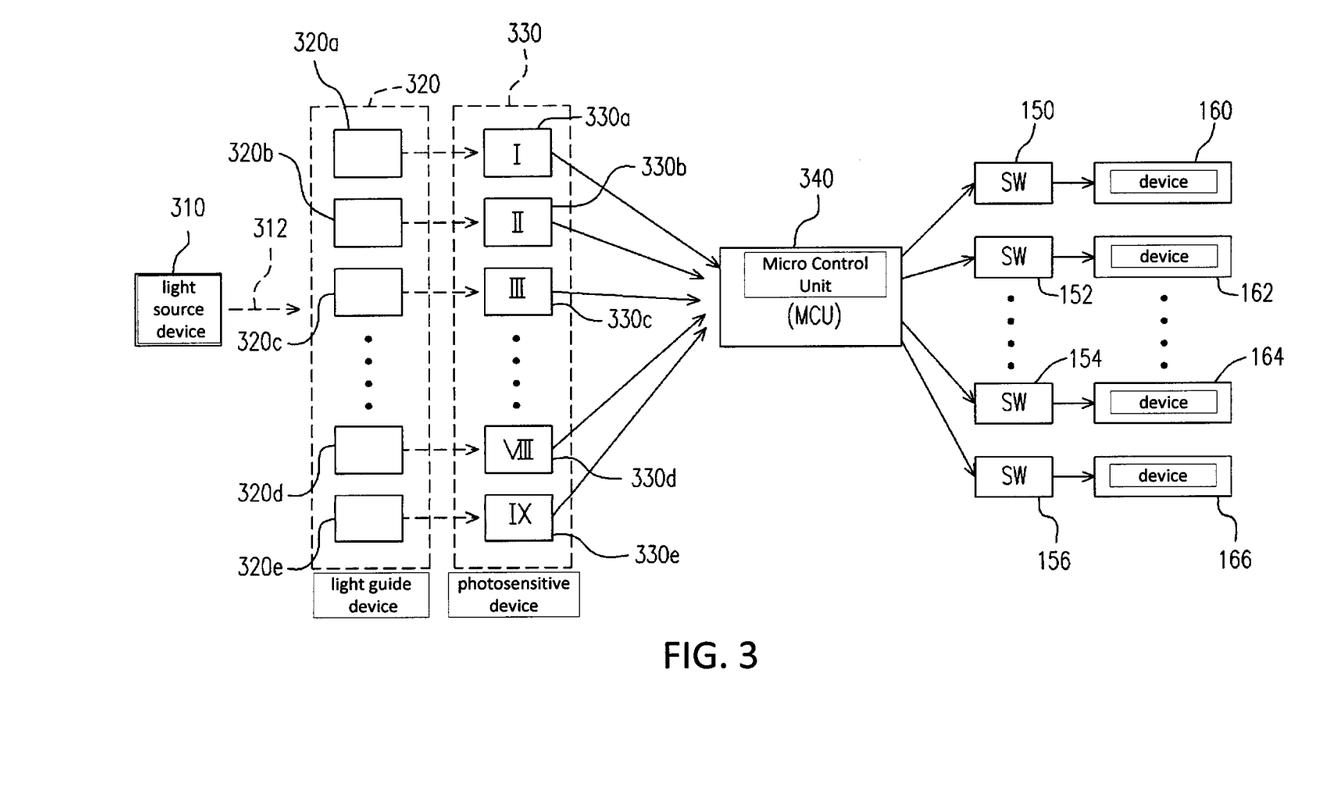

FIG. 3 is a diagram illustrating a photosensitive multi-control system in accordance with another embodiment of the present disclosure. Referring to FIG. 3, the photosensitive multi-control system comprises a light source device 310, a light guide device 320, a photosensitive device 330, a MCU 340 and a plurality of switches (SW), switches 350, 352, 354, 356 corresponding to controlled devices 360, 362, 364, 366, respectively.

Comparing FIG. 3 and FIG. 1, the difference is the configuration between the light guide device 320 and the photosensitive device 330 of the photosensitive multi-control systems, and the other elements are similar to those described in the embodiments of FIG. 1.

In some embodiments, the photosensitive device 330 includes a plurality of independent and separate photosensitive units, as shown in photosensitive units 330a, 330b, 330c, 330d and 330e of FIG. 3. The light guide device 320 comprises a plurality of light guide units 320a, 320b, 320c, 320d and 320e, each corresponding one-to-one to each one of photosensitive units 330a, 330b, 330c, 330d and 330e.

The light source device 310 generates a directional light beam with predetermined energy, for example, a laser beam, responsive to user's actuation. The user may aim the light beam at one of the light guide units 320a, 320b, 320c, 320d and 320e, which transmits the light beam to the corresponding photosensitive units 330a, 330b, 330c, 330d and 330e, respectively, which in turn transmits a respective sensing signal to the MCU 340. Each light guide unit and the corresponding photosensitive unit are in some embodiments combined into a specific device, such as lamp holders or light fixtures at different physical locations, to provide the user with a free choice to control these lamp holders or light fixtures. According to the received sensing signal, the corresponding control data is interpreted to control the respective switch. For example, the control data received by the MCU 340 is to control the switch 350, then further control device 360.

In some embodiments, one or more of the switches is to turn ON/OFF the corresponding device, for example, a toggle switch, or is a switch that uses an incremental and rotary manner to switch the corresponding device.

Figure 4:
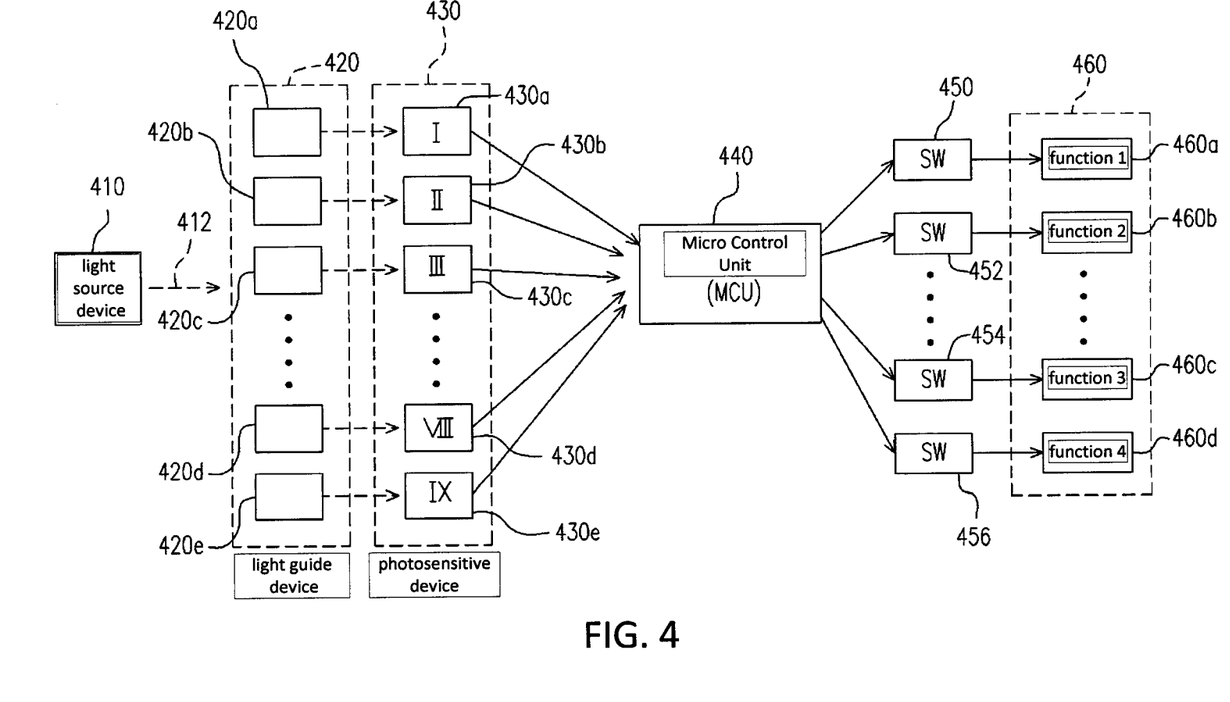

FIG. 4 is a diagram of another single-object-multi-switches control structure in accordance with another embodiment. This multi-function control system includes at least light source device 410, light guide device 420, photosensitive device 430, Micro Control Unit (MCU) 440 and switches (SW) 450, 452, 454, and 456 to control the switching of different functions 460a, 460b, 460c and 460d of the single functional unit or device 460.

The structure in FIG. 4 is similar to FIG. 2, the difference being configurations of the light guide device 420 and photosensitive device 430. The descriptions for the other components being omitted.

The architecture shown in FIG. 4 is also similar to the photosensitive multifunction control system in FIG. 3. The difference is that the MCU controls the different functions of a single device.

Figure 5A:
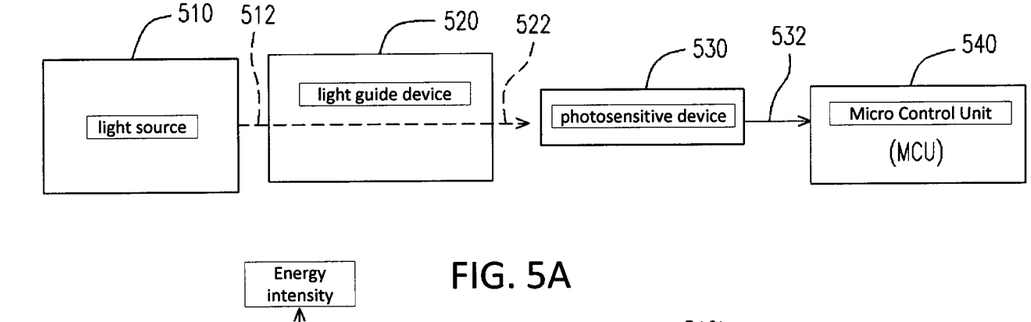

FIG. 5A is a block diagram of an alternative embodiment. Referring to FIG. 5A, the photosensitive multifunction control system comprises a laser source 510, a light guide device 520, a photosensitive device 530 and a MCU 540. The principle of operation of this embodiment is that when a laser beam 512 from the laser source 510 activated by the user is guided through the light guide device 520 to the photosensitive device 530, the photosensitive device, generates a corresponding sensing signal 532 and then transmits generated signal 532 to the MCU 540, in response.

In this embodiment, the photosensitive multiple function control system implements a laser beam with a uni-directional property, but not limited thereto, to trigger an operation, e.g., to activate a controlled device or a function of a controlled device. In some embodiment, the MCU 540 is directly connected to the controlled device without an intermediate switch. A laser source or another light source with a uni-directional property is applicable to generate a respective control message in this embodiment.

Figure 5B:
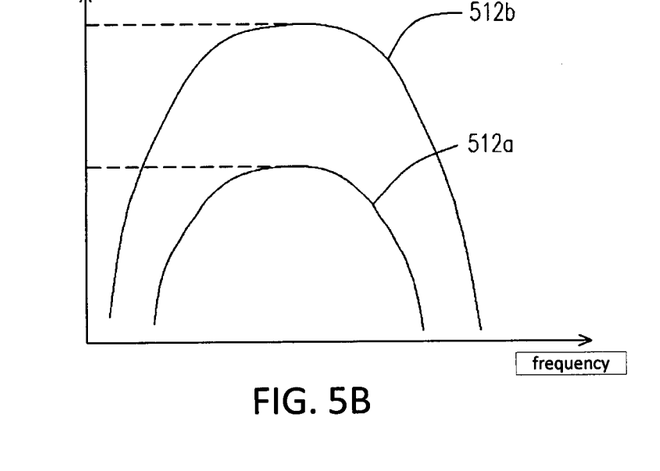
FIG. 5B is an example graph of laser beam energy distribution in accordance with one or more embodiments.

Referring to FIG. 5B, the MCU 540 in some embodiments is configured to perform different reactions or interpretations according to the intensity of laser beam 512 from the light source device 510. For example, for user's convenience, a laser beam 512a with lower energy intensity is interpreted in some embodiments by MCU 540 as a positioning signal with which the user can scan through regions of the photosensitive device 530 or from one photosensitive device 530 to another (by guiding the light beam either directly to the photosensitive device 530 or to the associated light guide device 520) without triggering activation or switching of a controlled device or its functions. The lower energy beam in one or more embodiments is visible for facilitating the user's aiming to target the desired photosensitive device 530. By contrast, a beam 512*b* with higher intensity is interpreted as a triggering signal. In one or more embodiments, after the user has aimed the laser beam of a low energy level at the desired photosensitive device 530 or its desired region, the user switches the laser beam to a high energy level, thereby activating the device controlled by the desired photosensitive device 530 or its function. Therefore, remote control of the whole system from a distance is performed with ease. More than two laser levels are envisaged in further embodiments.

In some embodiments, a laser beam from light source device 510 is a pulse laser which is interpreted by MCU 540 as a control data. For example, photosensitive units on the photosensitive device 530 convert the sensed signal into a pulse signal, and the information represented by the pulse signal is interpreted later as a control message. In some embodiments, the light source device 510 is provided with multiple buttons like a regular remote control, and the activation of the buttons causes multiple control messages to be coded in the form of different pulse information/patterns in the laser beam which, in turn, control different devices and/or functions of one or more such devices.

Figure 5C:
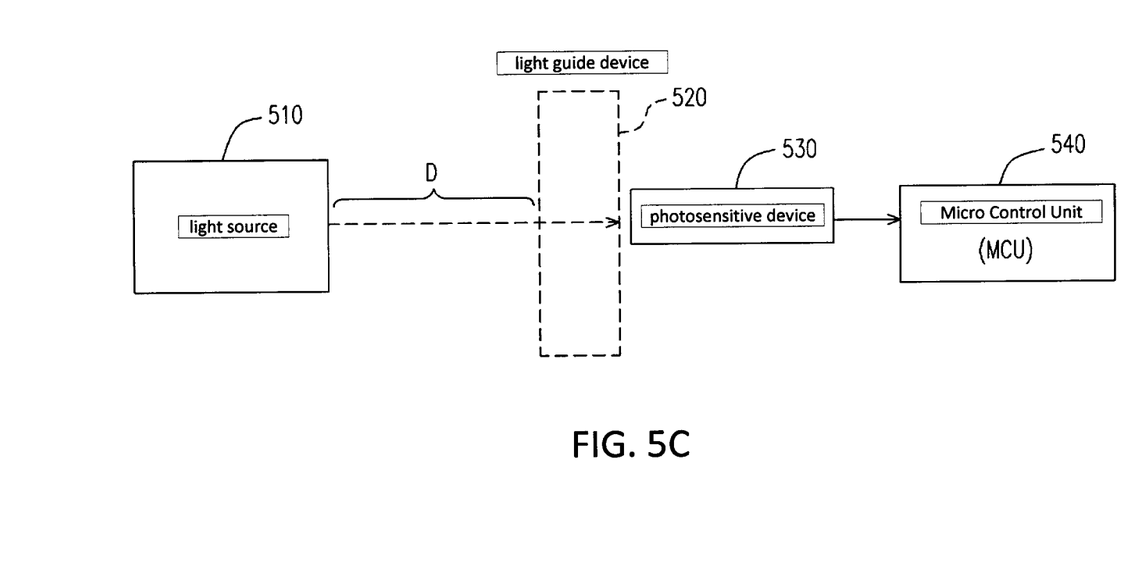
FIG. 5C is a diagram illustrating a working distance between a light source and a lightguide device of the photosensitive multifunction control system in accordance with one or more embodiments.

Combinations of one or more configurations and/or concepts of the foregoing disclosure are possible as long as the intensity of signal from the light source device to the light sensing device, despite the distance therebetween, is strong enough to be sensed at the light sensing device. The working distance D (FIG. 5C) between light source device 510 and light guide device 520 in some embodiments is up to 10 meters, but in further embodiments, is up to thousands meters. In some embodiments, the laser beam from light source device 510 is detectable by the photosensitive device 530 from a couple of kilometers away, e.g., no less than seven kilometers.

Figure 5D:
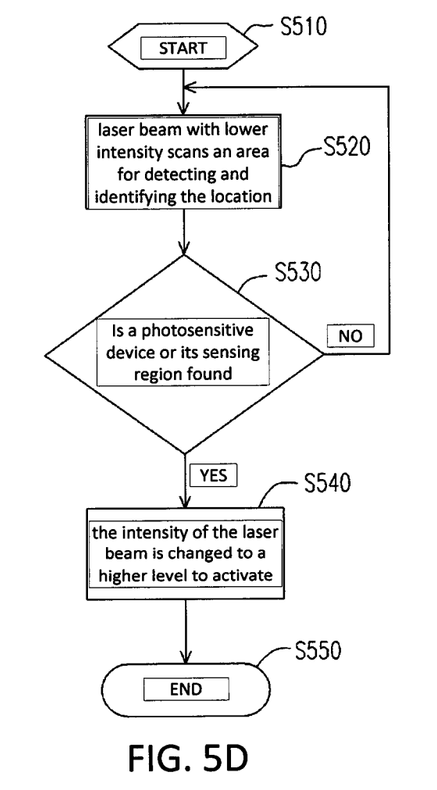
FIG. 5D is a flowchart of the operation of photosensitive multifunction control system controlled by a light source in accordance with one or more embodiments.

FIG. 5D is a flow chart of a control method in accordance with one or more embodiments. First, a user triggers a light source device (step S510) to emit a directional light beam, e.g., a laser beam with lower intensity, to scan an area for detecting and identifying the location (step S520) of the light guide device or the photosensitive device or the photosensitive device's sensing region corresponding to a desired controlled device. If such light guide device or photosensitive device or its sensing region is/are not found (step S530), then the user continues to scan (back to step S520). If the light guide device or photosensitive device or its sensing region of the desired device is detected and the location is identified, the intensity of the laser beam is changed to a higher level so as to activate (step S540), either directly from the MCU 540 or via a respective switch, the device or a function of the device. Once the control is achieved, the operation is over (step S550).

In the above disclosure, a laser beam with lower initial intensity is used to search for an available photosensitive device or sensing region in a specific area. If a photosensitive device or sensing region is found, the control system then reacts correspondingly, e.g., with a flash of light or any other visible and/or audible positioning signal, on the device corresponding to the found photosensitive device or sensing region. If the visible and/or audible positioning signal comes from a unwanted device, the scanning is continued with the low energy laser to other areas, until the desired device gives its positioning signal, at which time, the intensity of the laser beam is changed to a higher level so as to control the positioned device. The control system performs different control reactions according to what level of intensity of laser beam is sensed.

Figure 6:
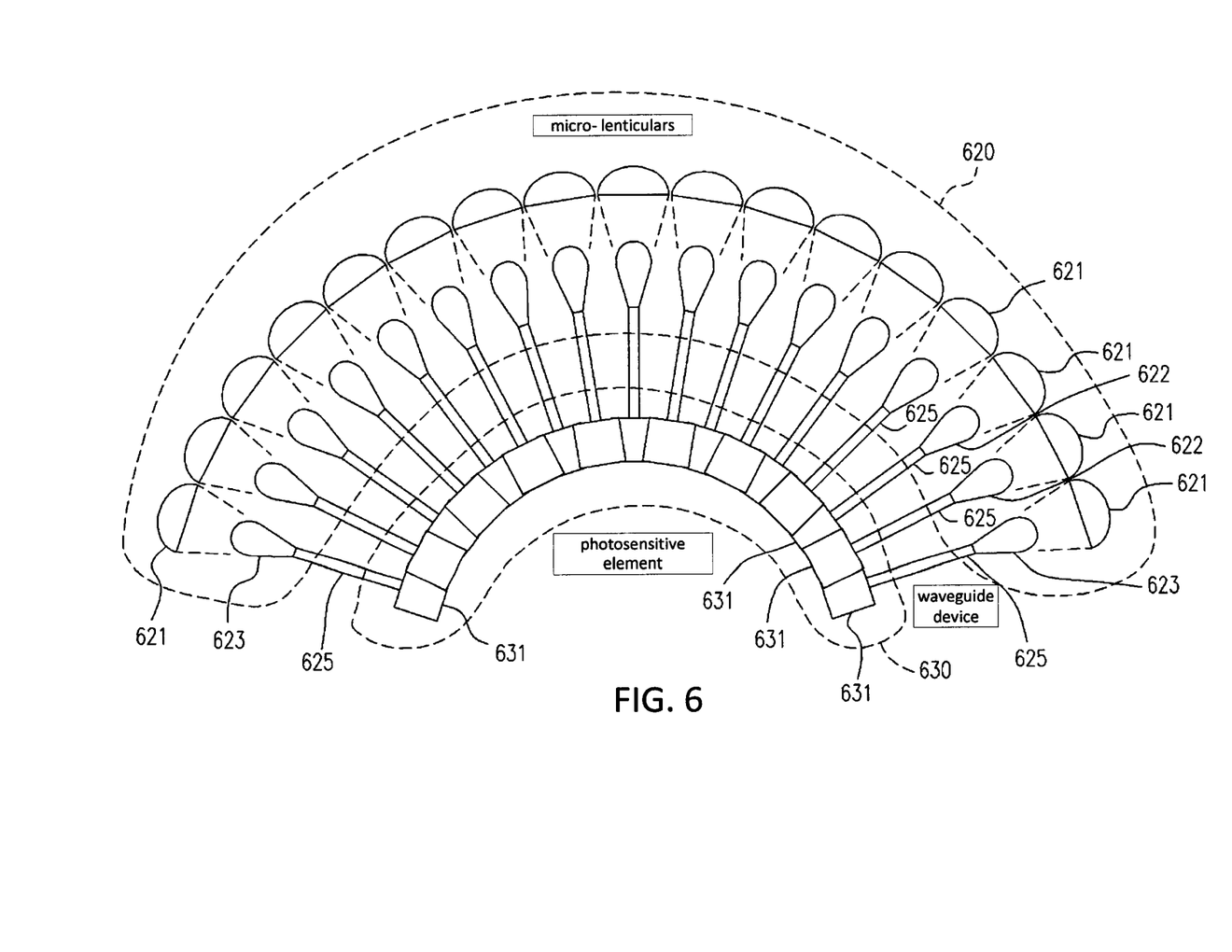
FIG. 6 is a diagram of a cross-section of the structure of a light guide device of the photosensitive multifunction control system in accordance with one or more embodiments.

One or more of the exemplary embodiments of the multifunction control system has a light guide device coupled between the light source device and the photosensitive device, to guide the directional light beam to the photosensitive device. With this light guide device, the beam directed to the photosensitive device located at a distance is more efficiently sensed. FIG. 6 is a diagram of an exemplary embodiment which includes light guide device 620 and photosensitive device 630. The light guide device 620 includes a micro-lens array and a waveguide device.

The micro-lens array is a Fly Eye Lens, which is composed of a so-called Compound Light Directing Member. As shown in the figure, a plurality of microlenticulars 621 are arranged on a curved surface. The location of each micro lenticular 621 corresponds to a waveguide device, e.g., an optical fiber or an optical fiber bundle, including a receiving portion 623 and a light guiding portion 625. The light guiding portion of the waveguide device 622 is optically connected to a respective photosensitive element 631 of the photosensitive device 630.

The light guide device 620 may be called the compound eye lens (Fly Eye Lens) optical detector that is the circuit collecting light, through convex bulges formed in front while the concentration of light point reacts with the resin to form a conical body, will guide the light deep into the structure. The structure is similar to so-called rhabdom in the eyes of insects. Polymers respond to light point and change the optical properties of this material, which refers to the fact that light entering the waveguide propagates along its longitudinal direction.

In an exemplary embodiment of manufacturing process, the light guide device is a resin hemisphere, completely covered by the lens, which is then pierced by ordered waveguide to guide the light into the center of the hemisphere. The direct result of light (infrared light) falling on the light detector, drives the corresponding lighting or other electrical devices.

In the highly sensitive optical sensing structure with a high density micro-lens array shown in FIG. 6 and the microlenticular condensing principle, the better optical lens curvature and the better lens eccentricity achieves better accuracy of optical angle, or even focusing directly on the optical sensing device. The light beam is focused on the high-density micro-lens array, and the compound eye lens is configured to correspond to one or more different functional units to be triggered by the photosensitive device. When a photosensitive device belonging to a functional unit senses a light beam, the photosensitive device triggers a microprocessor to process the corresponding functional unit's operation. In some embodiments, single light source device drives several electrical devices of the same type or different types. For another example, if many people in the same environment each have a laser pointer, each one of them can manually control the ambient illumination, without being limited by manipulation/operation control distance and/or frequency channel.

Figure 7:
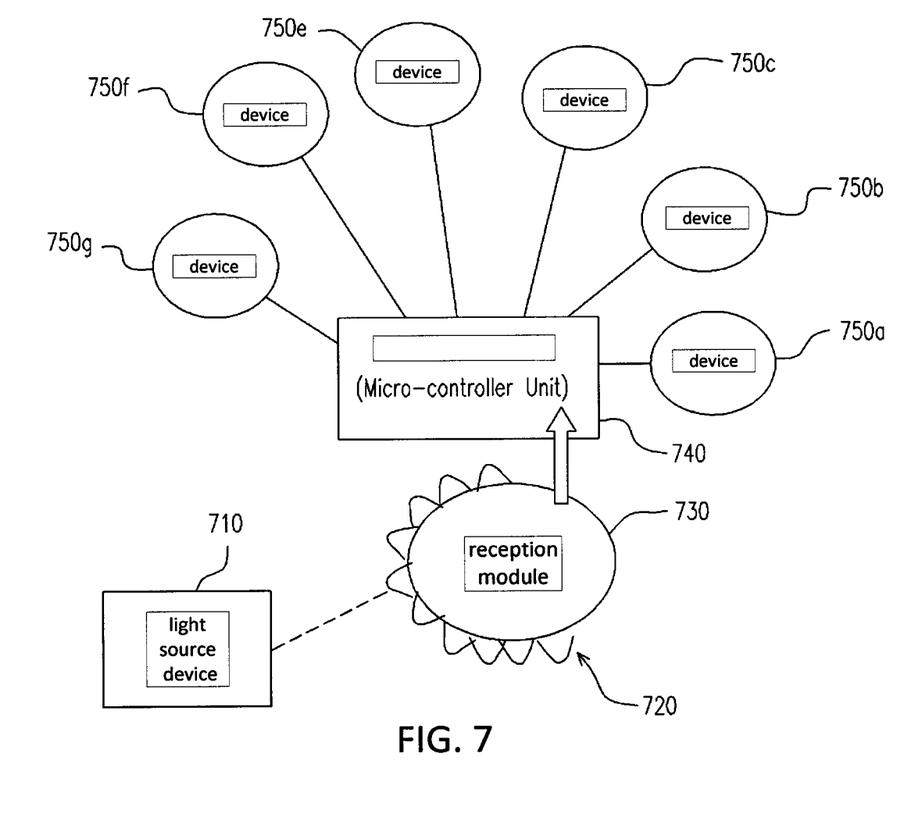
FIG. 7 is a diagram of an application architecture of the photosensitive multi-control system in accordance with one or more embodiments.

An embodiment of the photosensitive multifunction control system that uses the described micro-lens array as the control input interface is shown in FIG. 7. Through a light source device 710, such as a laser light source device or any other directional light source device, and a reception module 730, the purpose of sending control messages is achieved. The reception module 730 in one embodiment includes, for example, the micro-lens array as shown in FIG. 6, having an integrated module of a ball-shaped structure of the light guide devices and optical sensing devices.

In this embodiment, light source device 710, such as laser pointer, is capable of transmitting a directional light beam in a narrow band and can be directly manually manipulated. The reception module 730 contains a compound light directing member 720, which is configured to amplify, process and/or collect light, and an optical detector. When a light beam hits the light detector, the light detector produces a sensing signal which is then transmitted to the MCU 740 to present the incoming instructions or data. Therefore, responsive to light beams impacting onto different light detectors, each instruction or data can be fetched to control the system.

One exemplary embodiment disclosed is applied to implement an intelligent control system for electrical devices. The compound eye lens corresponds to the optical sensing device of a number of function devices to be triggered. When a photosensitive device belonging to the triggered device detects a light beam, it activates the microprocessor processing operation of the corresponding device/devices. A single light source device can drive several electrical devices (such as device 750a~750g as shown).

Figure 8:
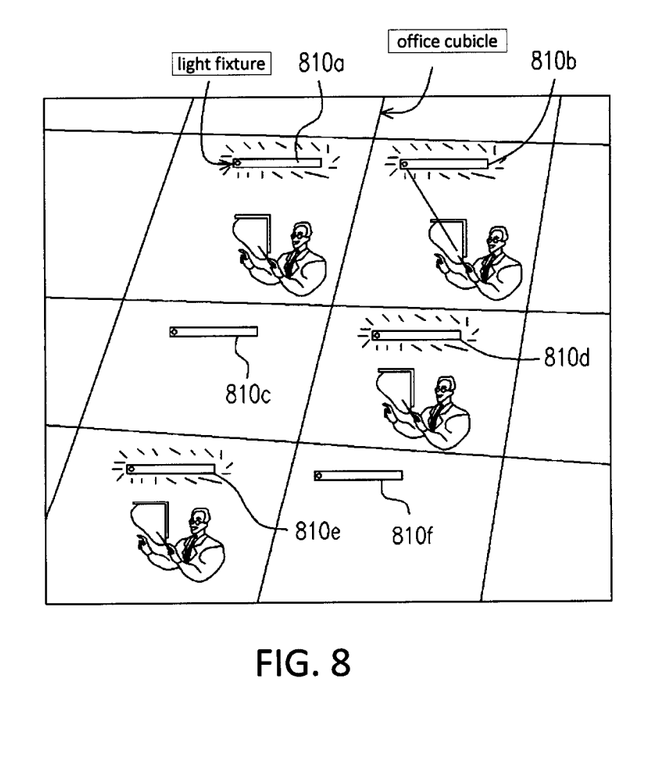
FIG. 8 is a diagram of use of an application utilizing the photosensitive multifunction control system in in conjunction with intelligent light control in accordance with one or more embodiments.

An implementation of the proposed photosensitive multifunction control system is shown in FIG. 8 for light control. Generally, light is turned on or turned off manually through a switch, or through radio frequency remote or infrared remote control. The user must turn off the light when he/she leaves a place, otherwise energy is wasted if the light is left turned on.

An application of the photosensitive multifunction control system is a kind of energy saving lighting device by controlling through the input interface of a lighting system. Each light fixture 810a-810f is further provided with a receiver module. A light source device, such as the laser pen operated by hand, emits a narrowband and directional light beam, and the receiver module, which includes a light guiding device or a compound light directing member as disclosed herein, collects the light.

The collected light is guided to a light sensing device at the light fixture or at a remote place where a sensing signal is generated, and the generated signal is then sent as instruction data to the system through electrical circuitry. The incoming instructions of data, which are transmitted to the system through the light beams, control the light thereby saving energy. The intelligent light source devices as shown in FIG. 810a~810f have an input interface of the control system according to the embodiment.

Figure 9:
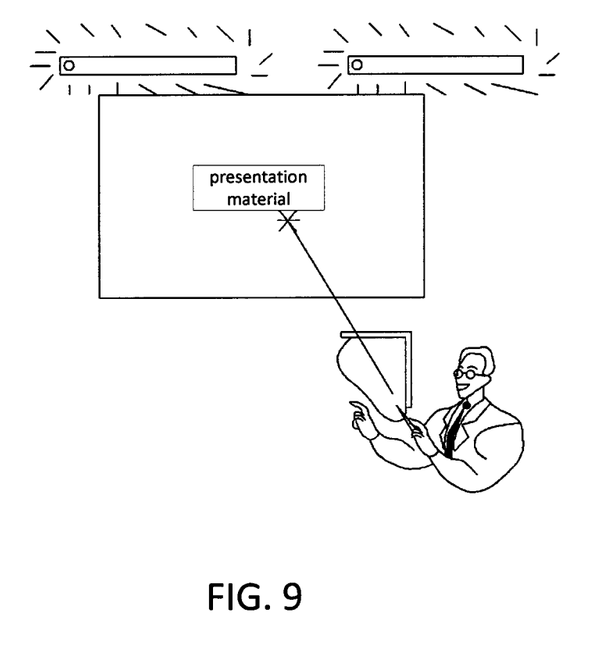
FIG. 9 is a diagram of use of an application utilizing the photosensitive multifunction control system in conjunction with projection device control in accordance with one or more embodiments.

Another application of the photosensitive multifunction control system is shown in FIG. 9. In a conference room, one can present the displayed presentation slides forward or backward by using a control unit (e.g., a laser pen) optically coupled with a photosensitive mechanism to control the projector.

Although specific embodiments have been illustrated and described herein, it should not be considered restrictive of the scope of the disclosure. Any adaptation or variation with a true scope and spirit of the disclosure by those of ordinary skill in the art is possible.

What is claimed is:

1. An operating method for a photosensitive multiplex control system, the method comprising:
    generating a response from the photosensitive multiplex control system acknowledging the position of a photosensitive device, in response to a first laser beam of a first energy level guided at the photosensitive device of the system to position the photosensitive device; and
    activating, by the photosensitive multiplex control system, a device coupled to be controlled by the system or a function of the device, in response to a second laser beam of a second energy level guided at the positioned photosensitive device,
    wherein the first energy level is lower than the second energy level, so that the first laser beam does not cause the system to activate the device or the function of the device when the first laser beam is guided at the photosensitive device.

2. The method of claim 1, wherein the photosensitive multiplex control system generates different control signals for activating (i) different devices coupled to be controlled by the system or (ii) different functions of one or more of said devices according to laser beams of different energy levels.

3. A photosensitive control system, comprising:
    a photosensitive device comprising at least one photosensitive unit arranged to generate a sensing signal responsive to a directional light;
    a light source device configured to provide the directional light;
    a light guide device for guiding the directional light to the at least one photosensitive unit; and
    a controller coupled to the photosensitive device and configured to generate control data responsive to the sensing signal,
    wherein the light source is configured to generate the directional light at a first energy level and at a second energy level higher than the first energy level, the photosensitive unit configured to generate different first and second sensing signals in response to the different first and second energy levels, respectively, and the controller configured for generating different first and second control data in response to said different first and second sensing signals, respectively.

4. The photosensitive control system of claim 3, wherein the light source device is separated from the light guide device by a predetermined distance.

* * * * *